(12) United States Patent
Li et al.

(10) Patent No.: US 7,324,671 B2
(45) Date of Patent: Jan. 29, 2008

(54) SYSTEM AND METHOD FOR MULTI-VIEW FACE DETECTION

(75) Inventors: ZiQing Li, Beijing (CN); ZhenQiu Zhang, Beijing (CN); HongJiang Zhang, Beijing (CN)

(73) Assignee: Microsoft Corp., Redmond, WA (US)

( * ) Notice: Subject to any disclaimer, the term of this patent is extended or adjusted under 35 U.S.C. 154(b) by 21 days.

(21) Appl. No.: 11/299,504

(22) Filed: Dec. 12, 2005

(65) Prior Publication Data

US 2006/0120572 A1  Jun. 8, 2006

Related U.S. Application Data

(63) Continuation of application No. 10/091,100, filed on Mar. 4, 2002, now Pat. No. 7,050,607.

(60) Provisional application No. 60/339,545, filed on Dec. 8, 2001.

(51) Int. Cl.
*G06K 9/00* (2006.01)
(52) U.S. Cl. .................................... 382/118
(58) Field of Classification Search ............... 382/118, 382/159, 181
See application file for complete search history.

(56) References Cited

U.S. PATENT DOCUMENTS

| | | | | |
|---|---|---|---|---|
| 5,774,591 | A * | 6/1998 | Black et al. ................. | 382/236 |
| 6,272,231 | B1 * | 8/2001 | Maurer et al. ............... | 382/103 |
| 6,671,391 | B1 * | 12/2003 | Zhang et al. ................ | 382/118 |
| 6,804,391 | B1 * | 10/2004 | Blake et al. ................. | 382/159 |
| 6,829,384 | B2 * | 12/2004 | Schneiderman et al. ..... | 382/154 |
| 6,944,319 | B1 * | 9/2005 | Huang et al. ................ | 382/118 |
| 2003/0123754 | A1 * | 7/2003 | Toyama ........................ | 382/291 |

OTHER PUBLICATIONS

Ng, J. and S. Gong. "Performing milti-view face detection and pose estimation using a composite support vector machine across the view sphere" Proc. IEEE International Workshop on Recognition, Analysis and Tracking of Faces and Gestures, pp. 14-21, 1999.*
Li, Y. M., S.G. Gong, and H. Liddell "Support Vector regression and classification based multi-view face detection and recognition" Proc. IEEE Int. Conf. of Face and Gesture Recognition, pp. 300-305, Mar. 2000.*
Rowley, H.A., S. Baluja and T. Kanade, "Neural network-based face detection", in IEEE transactions on Pattern Analysis and Machine Intelligence, vol. 20, No. 1, pp. 23-38, Jan. 1998.*
Fleuret, F. and D. Geman. Coarse-to-fine face detection. International Journal of Computer Vision, 20:1157-1163, 2001.*
Viola, P. and M. Jones. Robust real time object detection. In IEEE ICCV Workshop on Statistical and ☐☐Computational Theories of Vision, Vancouver, Canada, Jul. 13, 2001.*

* cited by examiner

*Primary Examiner*—Matthew C. Bella
*Assistant Examiner*—Tom Y Lu
(74) *Attorney, Agent, or Firm*—Lyons & Harr, LLP; Katrina A. Lyon

(57) ABSTRACT

A system and method for real-time multi-view (i.e. not just frontal view) face detection. The system and method uses a sequence of detectors of increasing complexity and face/non-face discriminating thresholds to quickly discard non-faces at the earliest stage possible, thus saving much computation compared to prior art systems. The detector-pyramid architecture for multi-view face detection uses a coarse-to-fine and simple-to-complex scheme. This architecture solves the problem of lengthy processing that precludes real-time face detection effectively and efficiently by discarding most of non-face sub-windows using the simplest possible features at the earliest possible stage. This leads to the first real-time multi-view face detection system which has the accuracy almost as good as the state-of-the-art system yet 270 times faster, allowing real-time performance.

25 Claims, 8 Drawing Sheets

FIG. 7 ARBITRATION

FIG. 8
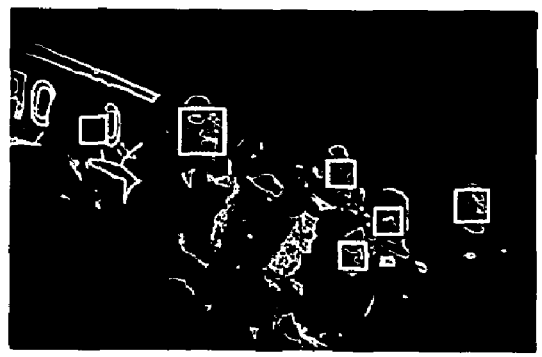
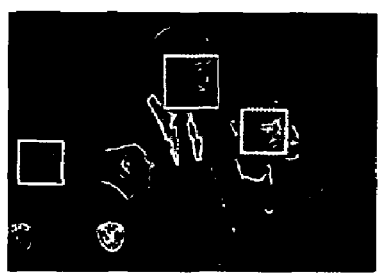
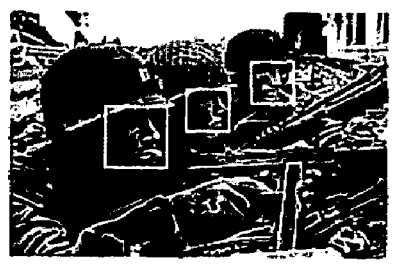

SYSTEM AND METHOD FOR MULTI-VIEW FACE DETECTION

CROSS-REFERENCE TO RELATED APPLICATIONS

This is a continuation of a prior application entitled "A SYSTEM AND METHOD FOR MULTI-VIEW FACE DETECTION" which was assigned Ser. No. 10/091,100 and was filed Mar. 4, 2002, now U.S. Pat. No. 7,050,607 which claimed the priority of provisional application No. 60/339,545 filed on Dec. 8, 2001"

BACKGROUND

1. Technical Field

This invention is directed toward a face detection system and process for detecting the presence of faces of people depicted in an input image, and more particularly to such a face detection system and process that can detect faces at various orientations in real-time.

2. Background Art

Face detection systems essentially operate by scanning an image for regions having attributes which would indicate that a region contains a person's face. These systems operate by comparing some type of training images depicting people's faces (or representations thereof) to an image or representation of a person's face extracted from an input image. Furthermore, face detection is the first step towards automated face recognition. It has remained a challenging problem especially for non-frontal view faces. This challenge is firstly due to the large amount of variation and complexity brought about by the changes in facial appearance, lighting and expression [2, 28]. Changes in facial view (head pose) further complicate the situation because the distribution of non-frontal faces in the image space is much more dispersed and more complicated than that of frontal faces. Learning based methods have so far been the most effective ones for face detection. Most face detection systems learn to classify between face and non-face by template matching. They treat face detection as an intrinsically two-dimensional (2-D) problem, taking advantage of the fact that faces are highly correlated. It is assumed that human faces can be described by some low-dimensional features which may be derived from a set of prototype or training face images. From a pattern recognition viewpoint, two issues are essential in face detection: (i) feature selection, and (ii) classifier design in view of the selected features.

A procedure developed by Freund and Shapire [8], referred to as AdaBoost, has been an effective learning method for many pattern classification problems, to include face detection. AdaBoost is a sequential forward search procedure using the greedy selection strategy. Its heuristic assumption is monotonicity, i.e. that when adding a new feature to the current set, the value of the performance criterion does not decrease. The premise offered by this sequential procedure can be broken-down when the assumption is violated, i.e. when the performance criterion function is non-monotonic. As a sequential search algorithm, AdaBoost can suffer from local optima when the evaluation criterion is non-monotonic.

Another issue is real-time multi-view face detection. Previous face detections systems, especially any that can detect faces in multiple viewpoints, are very slow, too slow to be used for real time applications. Most existing works in face detection, including Viola et al. [33], deal with frontal faces. Sung and Poggio [31] partition the frontal face and non-face image spaces each into several probability clusters, derive feature vectors in these subspaces, and then train neural networks to classify between face and nonface. Rowley et al [23] trained retinally connected neural networks using preprocessed image pixel values directly. Osuna et al [18] apply the support vector machines algorithm to train a neural network to classify face and non-face patterns. Roth et al. [22] use a SNoW learning architecture specifically tailored for learning in the presence of a very large number of features for the face and non-face classification.

In Viola et al.[33], simple Haar-like features, used earlier in Papageorgiou [19] for pedestrian detection, are extracted; face/non-face classification is done by using a cascade of successively more complex classifiers which are trained by using the (discrete) AdaBoost learning algorithm. This resulted in the first real-time frontal face detection system which runs at about 14 frame per second for a 320×240 image [33]. However, the ability to deal with non-frontal faces is important for many real applications because, for example, statistics show that approximately 75% of the faces in home photos are non-frontal [15]. A reasonable treatment for multi-view face detection is the view-based method taught by Pentland et al.[20], in which several face models are built, each describing faces in a certain view. This way, explicit 3D modeling is avoided. Feraud et al. [6] adopt the view-based representation for face detection, and use an array of five detectors with each detector responsible for one view. Wiskott et al. [34] build elastic bunch graph templates for multi-view face detection and recognition. Gong and colleagues [10] study the trajectories of faces in linear Principal Component Analysis (PCA) feature spaces as they rotate, and use kernel support vector machines (SVMs) for multi-pose face detection and pose estimation [17, 16]. Huang et al. [11] use SVMs to estimate facial poses.

The system of Schneiderman and Kanade [26] is claimed to be the first algorithm in the world for multi-view face detection. Their algorithm consists of an array of five face detectors in the view-based framework. Each is constructed using statistics of products of histograms computed from examples of the respective view. However, it is very slow and takes one minute to work on a 320×240 pixel image over only four octaves of candidate size [26].

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a face detection system and process that overcomes the aforementioned limitations in prior face detection and recognition systems by making it possible to detect a person's face, in real time, in input images containing either frontal or non-frontal views of the person's face, regardless of the scale or illumination conditions associated with the face. Thus, a non-staged image, such as a frame from a video camera monitoring a scene, can be searched to detect a region depicting the face of a person, without regard to whether the person is directly facing the camera. Essentially, as long as the person's face is visible in the image being searched, the present face detection system can be used to detect the location of the face in the image. In addition, the system design allows for real-time multi-view face detection.

A detector-pyramid architecture is designed to detect multi-view faces efficiently. A coarse to fine strategy is used in that a sub-window is processed from the top to bottom of the detector pyramid by a sequence of increasingly more complex face/non-face classifiers designed for increasingly finer ranges of facial view. This is similar to the strategy used in Amid and Geman 1997, Fleuret and Geman 2001[1]. This strategy goes beyond the straightforward view-based method in that a vast number of nonface sub-windows can be discarded very quickly with very little loss of face sub-windows. This is very important for fast face detection because only a tiny proportion of sub-windows are of faces. Since a large number of nonface subwindows are discarded the processing time for face detection is significantly reduced.

In the system and method according to the present invention, simple image features are devised on which the face/nonface classification is performed. They are extensions of those used in Viola-Jones [33] and can be computed very quickly. Every detector in the pyramid is taught from face/nonface examples. Any method of teaching face/non-face classification could be used, such as one employing AdaBoost. However, a preferred learning algorithm is the subject of a co-pending application entitled "A METHOD FOR BOOSTING THE PERFORMANCE OF MACHINE-LEARNING CLASSIFIERS", which has the same inventors as this application and which is assigned to a common assignee. The co-pending application was filed on Mar. 4, 2002 and assigned Ser. No. 10/091,109. This new learning procedure is called FloatBoost and incorporates the idea of Floating Search [21] into AdaBoost [8,25]. While AdaBoost constructs a strong classifier from weak classifiers using purely sequential forward search, FloatBoost allows backtracking search as does Floating Search. This results in higher classification accuracy with a reduced number of weak classifiers needed for the strong classifier. FloatBoost learns to combine the weak classifiers needed for the strong classifier.

While the Viola-Jones detector [33] is the first real-time frontal face detector and Schneiderman-Kanade detector is the first (non real-time) multi-view face detector, the present system and method according to the present invention results in the first real-time multi-view face detection system which runs at five frames per second for 320×240 pixel image sequence on a conventional 700 MHZ Pentium III PC.

The following paragraphs discuss the detector-pyramid architecture for multi-view face detection, and the design and training of an individual detector and the system. Methods to arbitrate among multiple view channels are also presented.

Because the present face detection system and process can be used to detect both frontal and non-frontal views of a person's face it is termed a multi-view face detection system. For convenience in describing the system and process, the term "pose" or "view" will refer to the particular pitch, roll or yaw angles that describe the position of a person's head (where the 0 degree pitch, roll and yaw position correspond to a person facing the camera with their face centered around the camera's optical access).

As with most face detection system, the multi-view face detection system and process of the invention must first be trained before it can detect face regions in an input image. This training phase generally involves first capturing face and non-face images. As will be explained later, these captured face and non-face images are used to train a detector-pyramid that employs a sequence of increasingly more complex face/non-face classifiers designed for detecting increasingly finer ranges of facial views. Each classifier is dedicated to detecting a particular pose range. Accordingly, the captured training face images should depict people having a variety of face poses.

The captured training face images are preprocessed to prepare them for input into the detector pyramid. In general, this involves normalizing and cropping the training images. Additionally, the training images are roughly aligned by using the eyes and mouth. Normalizing the training images preferably entails normalizing the scale of the images by resizing the images. It is noted that this action could be skipped if the images are captured at the desired scale thus eliminating the need for resizing. The desired scale for the face is approximately the size of the smallest face region expected to be found in the input images being searched. In a tested embodiment of the present invention, an image size of about 20 by 20 pixels was used with success. These normalization actions are performed so that each of the training images generally match as to orientation and size. The face training images (but not the non-face training images) are also preferably cropped to eliminate unneeded portions of the image which could contribute to noise in the training process. It is noted that the training images could be cropped first and then normalized.

The prepared face image representations are used to train a detector pyramid architecture to detect faces at various poses in real time. This system adopts the coarse to fine (top-down in the pyramid) classifier strategy in that the full range of facial views is partitioned into increasingly narrow face pose ranges and whereby the whole face space is partitioned into increasingly smaller subspaces. Additionally, the detector pyramid system employs simpler classifiers at the top of the pyramid to more complex classifiers at the lower levels of the detector pyramid. This simple to complex scheme allows for a vast number of non-face image inputs to be rejected quickly whereas the classifiers in the lower levels in the pyramid are more complex (costing more processing time) and scrutinize only a relatively small number of input images.

The multi-view face detection system and method of the invention classifies images based on the value of simple features. It uses a combination of weak classifiers derived from tens of thousands of features to construct a powerful detector.

A weak classifier is one that employs a simple learning algorithm (and hence a fewer number of features). Weak classifiers have the advantage of allowing for very limited amounts of processing time to classify an input. Each face detector of the face detection system and process of the invention classifies an image sub-window into either face or non-face. Each detector is constructed based on boosting the performance of the weak classifiers by using a boosting procedure), while each weak classifier is taught from statistics of a single scalar feature.

Each such feature has a scalar value which can be computed very efficiently [27] via the summed-area table [4] or integral image [33] methods. The features can be non-symmetrical to cater to nonsymmetrical characteristics of non-frontal faces. A face/non-face classifier is constructed based on a number of weak classifiers where a weak classifier performs face/non-face classification using a different single feature. A detector in the detector pyramid architecture of the system can be one or a cascade of face/non-face classifiers. Since a simple to complex classifier scheme is used in the pyramid, the more complex classifiers or detectors of the invention employ a greater number of features and so classifiers.

It is known that given a feature set and a training set of positive and negative images any number of machine learning approaches can be used to learn a classification function. In the present invention various conventional learning approaches can be used to train the classifiers, e.g. Gaussian model, a small set of simple image features and a neural network or a support vector machine of the system and method according to the present invention.

One embodiment of the multi-view face detection system and method of the invention, however, uses a novel method to select the optimum features and to train the various detector classifiers. This method (the FloatBoost procedure) is used to boost the classification performance by linearly combining a set of weak classifiers to form a strong classifier. The boosting algorithm of the present invention has better performance than AdaBoost in the sense that fewer features are needed and higher accuracy is achieved.

To summarize the above, the construction of the detector-pyramid is done in the following way:
1. Simple features are designed. There are a number of candidate features.
2. A subset of the features are selected and the corresponding weak classifiers are taught using a boosting process.
3. A strong classifier is constructed as a linear combination of the weak classifiers.
4. A detector is composed of one, or a cascade, of strong classifiers.
5. At each level of the pyramid, the full range of face poses (out-of-plane rotation) is partitioned into a number of sub-ranges, and the same number of detectors are trained for face detection in that partition, each specialized for a certain pose sub-range.
6. Finally, the detector-pyramid is composed of several levels from the coarsest view partition at the top to the finest partition at the bottom.

Therefore, using FloatBoost, or another a conventional method of training, the detectors in the pyramid are trained separately using separate training sets. An individual detector is responsible for one view/pose range, with possible partial overlapping with its neighboring detectors.

In one embodiment of the multi-view face detection system of the invention, due to the symmetry of faces, side view detectors need to be trained for one side only. The models for the side not trained are deemed to be the mirrors of the trained side. This method saves about half of the training time for the system.

Once the system is trained it is ready to accept prepared input image regions and to indicate if the region depicts a face, even if the face is non-frontal in the image. To this end, the input image being searched is divided into sub-windows. For example, a moving window approach can be taken where a window of a prescribed size is moved across the input image, and at prescribed intervals, all the pixels within the sub-window become the next image region to be tested for a face. However, it is not known what size face depicted in an input image may be, and so the size of the sub-window must be considered.

One way of ensuring that a face of any practical size depicted in an input image is captured in the sub-window is to adopted an image pyramid approach. In this approach the window size is selected so as to be the smallest practical. In other words, the window size is selected so as to be the size of the smallest detectable face anticipated to be found in the input image. This sub-window size should also match the size chosen for the training face images used to train the system. For a tested embodiment of the present invention a window size of 20 by 20 pixels was chosen. Of course, many or all of the faces depicted in the input image will likely be larger than the aforementioned window size. Thus, the window would only cover a portion of the bigger faces and detection would be unlikely. This is solved by not searching the original input image with the search window (in order to find the "smallest" faces), but by also searching a series of increased scale sub-windows. For example, the original sub-window size can be increased by some scale factor (in a tested embodiment this scale factor was 1.25) in a step-wise fashion all the way up to the input image size itself, if desired. After each increase in scale, the input image is partitioned with the search sub-window size. In this way, larger faces in the original image would eventually fit into the sub-window. Alternately, the original sub-window size could be made to match the entire image and this sub-window can then be scaled down by some scale factor on an incremental basis.

Once a sub-window is extracted from the input image, it is input into the detector pyramid architecture of the present invention. The detector pyramid determines whether any of the sub-windows are a face and also classifies a detected face into a given face pose range.

One embodiment of the multi-view face detection system and method of the invention consists of three detector layers. The first layer consists of a single full-view detector, responsible for the full range of [−90,90] degrees (0 degrees being the frontal view). There are three detectors in the second layer, responsible for the three view ranges [−90,−40], [−30,+30], and [+40,+90], respectively. The third layer consists of nine detectors for detecting face poses of [−90,−80], [−70,−60], [−50, −40], [−30,−20], [−10, 10], [20,30], [40,50], [60,70], [80,90] degrees. Therefore, there are a total of 13 detectors in this embodiment. Up-down head rotations are not purposely dealt with in the system, but are tolerated by the system to up to +−30 degrees. In other words, the system is able to detect faces subject to plus or minus 30 degrees of up-down rotations.

Referring now to this embodiment, the multi-view face detection system and process performs as follows. The input image is divided into sub-windows as discussed above. One by one each sub-window is input into the first detector layer. If a sub-window is rejected by the detector at the top layer, it will be seen as a non-face region and will not be processed by later layers. If the sub-window goes through the first detector layer, it will be processed by second layer. If any detector in second layer classifies the sub-window as a face, it will be processed by the last detector layer. Otherwise it will be rejected as a non-face. There are many more detectors on the last layer of the detector framework, thus helping to detect probable face regions, while expending much less processing time on sub-windows that could not possibly include a face region. At the final detector layer of this embodiment, each detector only deals with 20 degree ranges of view and each detector has a high detection rate for that view range. This pyramid-like detector framework makes the system and method of the present invention have both a high detection rate and a rapid detection speed resulting in multi-view face detection.

It should be noted that there are cases wherein multiple (two or more) detectors detect a face in the same detector layer. The multi-view face detection system and method of the invention therefore arbitrates between these detections to determine if the detections represent two different faces or two detections of one face. If there are multiple detections that overlap and the scale is the same or similar, then the system will arbitrate the outputs of the detectors. If there are no detections that overlap then arbitration is not necessary and each face detection will be determined to be a separate face. In the arbitration process the output of some of the detector view ranges will be combined into one class. That is, five classes of view ranges are created (left profile, left half profile, frontal, right half profile and right profile) from the various pose range detectors at the detector pyramid's outputs. Then the system arbitrates between these five classes to categorize each overlapping detection into one of these five classes. This can be done by Rowley's heuristic method [23]. However, the present invention preferably employs another process for arbitration. In this arbitration process the system determines whether a face detection at any particular location is identified as a frontal face. If it is, then all other face locations detected by profile or half profile detectors that are overlapping in the initial image are determined to be errors and are eliminated and that particular location is determined to be a single frontal face. If the particular location is not identified as a frontal face, the system determines whether the given location is identified as a half profile face. If the location is identified as a half profile face then all other locations detected by profile face detectors are eliminated and the particular location is determined to be a half profile face. If the location is not a non-face, nor a frontal face, nor a half profile face, then the location is determined to be a profile face.

DESCRIPTION OF THE DRAWINGS

The specific features, aspects, and advantages of the present invention will become better understood with regard to the following description, appended claims, and accompanying drawings where:

FIG. 8 provides examples of detection results obtained using the system and method according to the invention.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
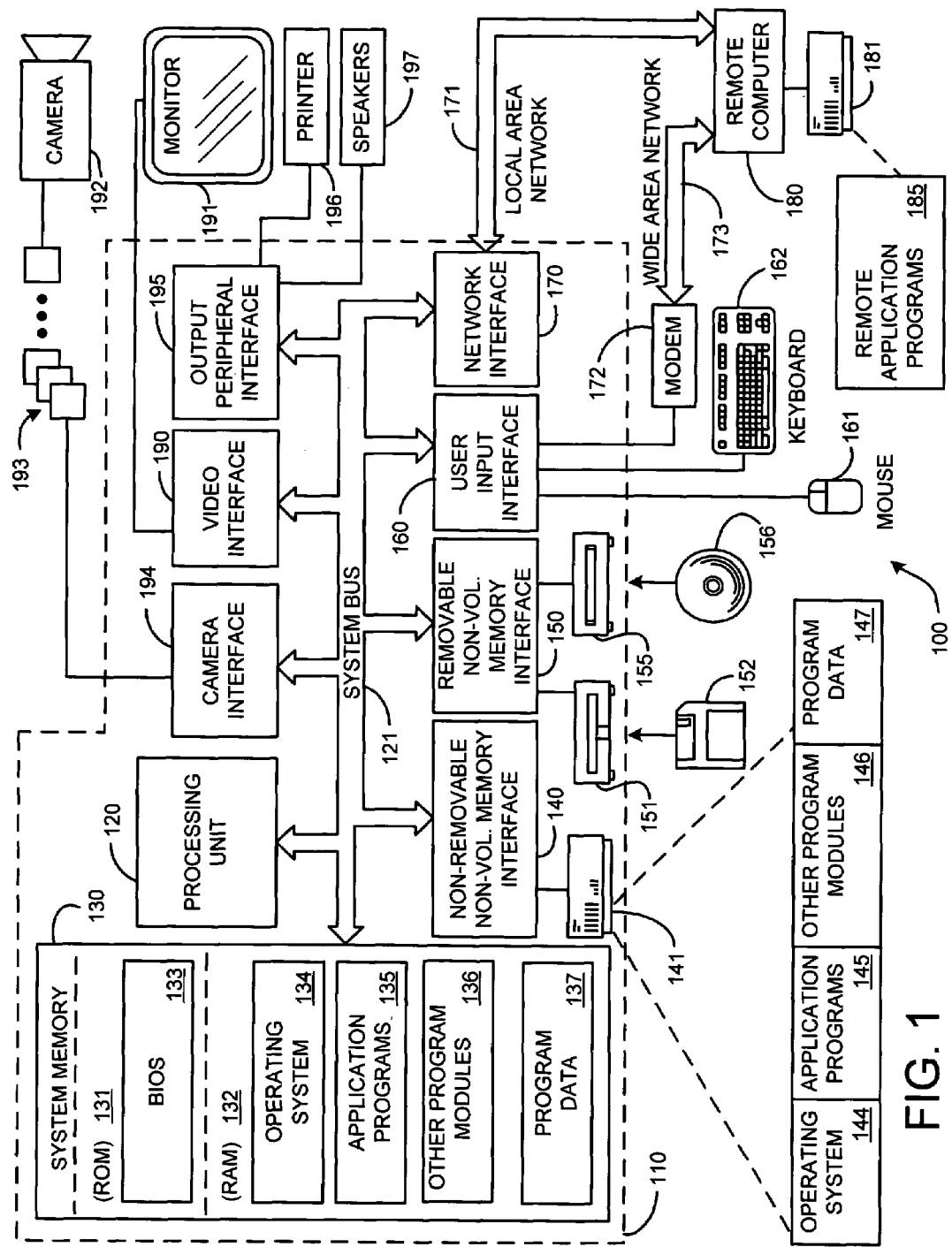
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Detector Pyramid System and Method

2.1 Overview

The present multi-view face detection system and process is distinguished from previous face detection systems in its ability to detect multi-view faces in real-time. It is designed based on the following thinking: While it is extremely difficult to distinguish multi-view faces from non-face images clearly using a single classifier, it is less difficult to classify between frontal faces and non-faces as well as between multi-view faces and parts of non-faces. Therefore, narrowing down the range of view makes face detection easier and more accurate for that view.

On the other hand, a vast number of sub-windows (e.g. 70,401 square sub-windows can result from the scan of a 320×240 image, from the size of 20×20 pixels to 240×240 for the size increment factor of 1.25 by the windowing process discussed later) result from the scan of the input image; among these only a tiny proportion of them are faces. Tremendous computation time can be saved if a sequence of detectors of increasing complexity and face/non-face discriminating power are applied to quickly discard non-faces at the earliest stage possible using the simplest possible features.

Figures 2, 4:
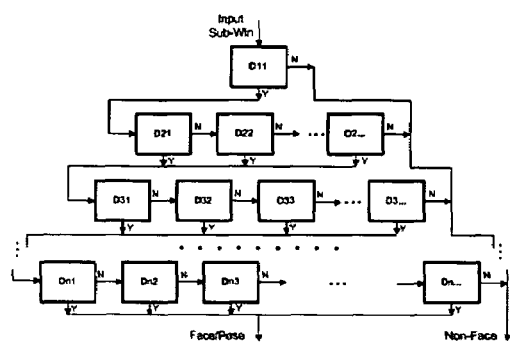
FIG. 2 is a diagram illustrating the general detector-pyramid architecture of the system and process according to the invention.
FIG. 4 is a schematic of the detector pyramid architecture of one specific embodiment of the system and method according to the invention.

The detector-pyramid architecture, generally shown in FIG. 2, is motivated by the above reasoning. It adopts the coarse to fine (top-down in the pyramid) strategy in that the full range of facial views is partitioned into increasingly narrower ranges at each detector level, and thereby the face space is partitioned into increasingly smaller subspaces. Also, the system and method according to the present invention adopts the simple-to-complex strategy in that the earlier detectors that initially examine the input sub-window are simpler and so are able to reject a vast number of non-face sub-windows quickly, whereas the detectors in the later stages are more complex and involved and spend more time to scrutinize only a relatively tiny number of remaining sub-windows.

Figure 3:
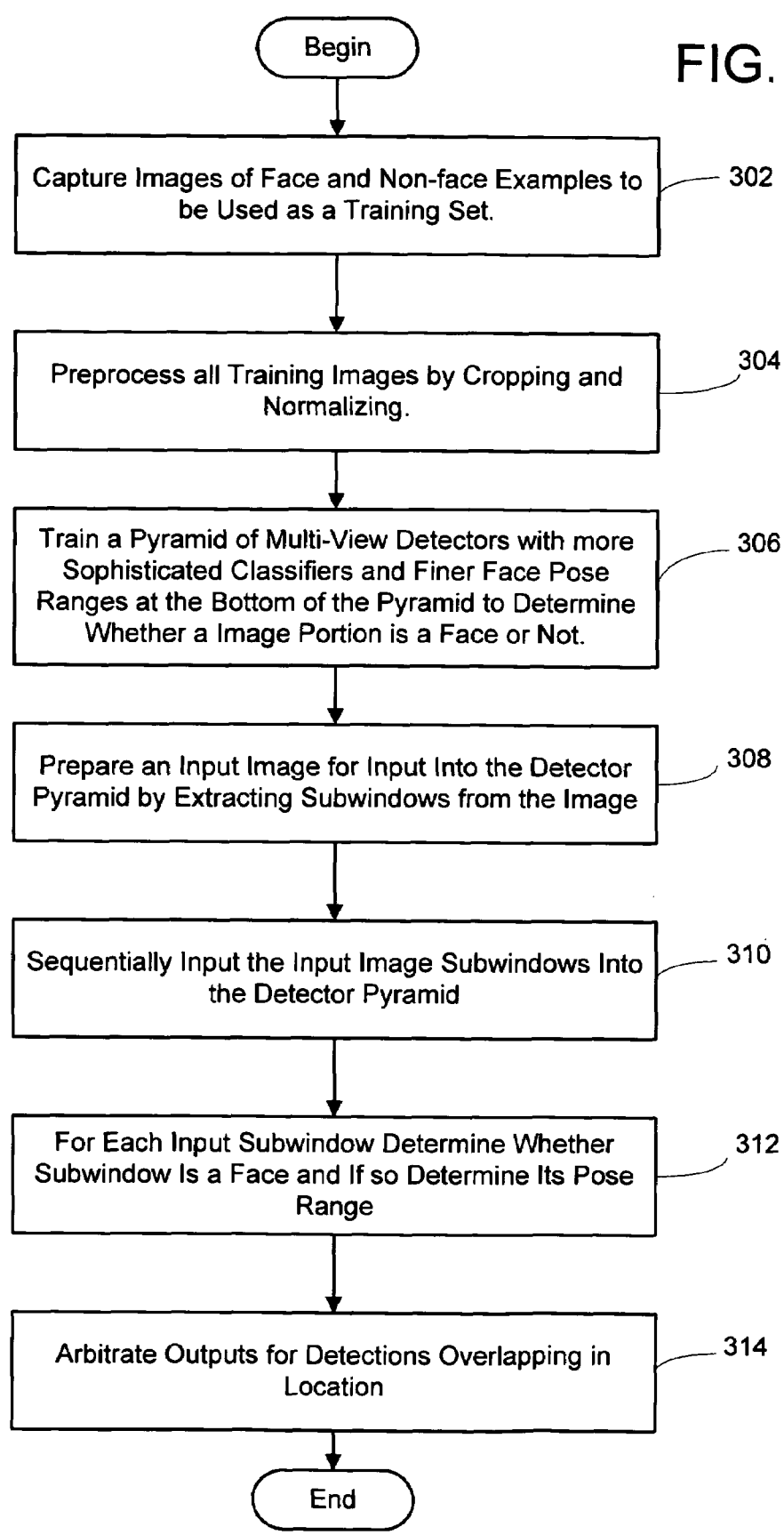
FIG. 3 is a flow diagram of the overall face detection process of the system and method of one embodiment of the invention.

For example, one embodiment of the system and method according to the present invention consists of three detector layers, as is shown in FIG. 3. The first layer 302 consists of a single full-view detector 302a, responsible for the full range of [−90,90] degrees (0 degrees being the frontal view). There are three detectors 304a, 304b, 304c in the second layer 304, responsible for the three view ranges [−90,−40], [−30,+30], and [+40,+90], respectively. The third layer 306 consists of nine detectors 306a, 306b, 306c, 306d, 306e, 306f, 306g, 306h, 306i for detecting face poses of [−90,−80], [−70,−60], [−50,−40], [−30,−20], [−10, 10], [20,30], [40, 50], [60,70], [80,90] degrees, respectively. Therefore, there are a total of 13 detectors in this embodiment. The full-view detector 302a in this embodiment, as tested, is able to reject about 50% of non-face sub-windows scanned in the performing stage, while retaining 99% of training face examples in the training stage. Only retained sub-windows possibly containing faces are further processed in the subsequent layers of finer detectors. The results from the detectors in the bottom layer are merged to make a final decision regarding the input sub-window. Up-down head rotations are not purposely dealt with in the system, but are tolerated by the system to up to +−30 degrees. In other words, the system is able to detect faces subject to plus or minus 30 degrees of up-down rotations.

Referring now to FIG. 4, the process actions according to the present system and method are generalized. In process action 402, images of face and non-face examples are captured to be used as a training set. All training images are then prepared for use by cropping and normalizing them (process action 404). As shown in process action 406, a pyramid of detectors, increasing in sophistication and complexity and partitioned into finer and finer range poses from top down, are trained. Then, in process action 408, an input image is prepared for input into the detector pyramid of the system and method of the present invention by extracting sub-windows from the input image into sub-windows. Each of these sub-windows is then input into the detector pyramid (process action 410). For each input sub-window the system determines whether the sub-window is a face, and if so, its pose range. If more than one detector of the present invention detects a face at close to the same location then the system arbitrates the outputs for the detectors with overlapping detections.

Details regarding the multi-view face detection system and process of the invention are described in the following paragraphs.

2.2 Creating the Training Data Set

The multi-view face detection system and process must first be trained before it can detect face regions in an input image. To this end, the training phase generally involves first capturing face and non-face images. As will be explained later, these captured face and non-face images will be used to train a detector-pyramid that employs a sequence of increasingly more complex face/non-face classifiers designed for detecting increasingly finer ranges of facial views. Each classifier is dedicated to detecting a particular pose range. Accordingly, the captured training face images should depict people having a variety of face poses.

The captured training face images are then preprocessed to prepare them for input into the detector pyramid. In general, this involves normalizing and cropping the training images. Additionally, the training images are roughly aligned by using the eyes and mouth. Normalizing the training images preferably entails normalizing the scale of the images by resizing the images. It is noted that this action could be skipped if the images are captured at the desired scale thus eliminating the need for resizing. The desired scale for the face is approximately the size of the smallest face region expected to be found in the input images being searched. In a tested embodiment of the present invention, an image size of about 20 by 20 pixels was used with success. These normalization actions are performed so that each of the training images generally matches as to orientation and size. The face training images (but not the non-face training images) are also preferably cropped to eliminate unneeded portions of the image which could contribute to noise in the training process. It is noted that the training images could be cropped first and then normalized.

2.3 Training the Detector Pyramid

Figure 5:
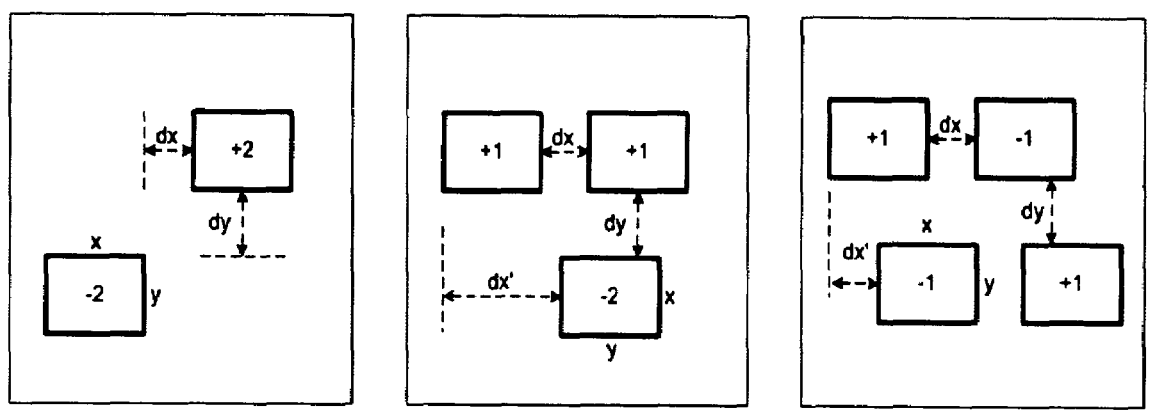
FIG. 5 is a diagram depicting three types of simple features shown relative to a sub-window.

The high speed and detection rate of the invention depend not only on the detector-pyramid architecture, but also on the individual detectors. Three types of simple features, which are block differences similar to steerable filters, are computed as shown in FIG. 5. The three types of simple features are shown relative to a sub-window. The sum of the pixels which lie within the white rectangles are subtracted from the sum of pixels in the black rectangles. Each such feature has a scalar value that can be computed very efficiently from the summed-area table [14] or integral image [6]. These features may be non-symmetrical to cater to nonsymmetrical characteristics of non-frontal faces. They have more degrees of freedom in their configurations than the previous use, which is 4 (x, y, dx, dy) in the two block features and 5 (x, y, dx, dx', 0, dy) in the three and and four block features, where dx and dx' can take on negative values whereas the others are constrained to positive values only. There are a total number of 102,979 two-block features for a sub-window of size 20×20 pixels. There are a total number of 188,366 three-block features (with some restrictions to their freedom). FIG. 5 depicts the three types of simple Harr wavelet like features defined in a sub-window. The rectangles are of size x by y and are at distances of (dx,dy) apart. Each feature takes a value calculated by the weighted (±1; 2) sum of the pixels in the rectangles.

A face/nonface classifier is constructed based on a number of weak classifiers where a weak classifier performs face/non-face classification using a different single feature, e.g. by thresholding the scalar value of the feature according the face/non-face histograms of the feature. A detector can be one or a cascade of face/nonface classifiers, as in [6].

The detectors in the pyramid are trained separately, using different training sets. An individual detector is responsible for one view range, with possible partial overlapping with its neighboring detectors. Due to the symmetry of faces, it is necessary to train side view detectors for one-side only, and mirror the trained models for the other side. For one feature used in left-side view, its structure is mirrored to construct a new feature used for right-side view. Each left-side view feature is mirrored this way, and these new features are combined to construct right side view detectors. Making use of the symmetry of faces, it is necessary to train, for each level, the frontal view detector plus those of non-frontal views on one side. Therefore, assuming there are L (an odd number) detectors at a level, it is necessary to train only (L+1)/2 detectors. The corresponding models for the other side can be obtained by mirroring the features selected for this side. So, 7 detectors are trained for a detector-pyramid composed of 11 detectors.

2.4 Detection Performance

The system deals with three types of head rotations which currently are in the following ranges: (1) out-of-plane rotations in the range of θ=[−90, +90], (2) in-plane rotations in the range of Φ=[−45, +45], and (3) a moderate amount of up-and-down nodding rotations. A view-based approach is adopted. A detector-pyramid is constructed to detect the presence of up-right faces, subject to out-of-plane rotations in θ and in-plane rotations between [−15, 15]. The design of such a detector-pyramid will be described shortly. In-plane rotations are handled as follows: (1) Divide into three sub-ranges $\Phi_1$=[−45,−15], $\Phi_2$=[−15,+15], and $\Phi_3$=[+15,+45]. (2) Apply the detector-pyramid on images in-plane-rotated by ±30° as well as on the original image. This will effectively cover in-plane-rotations in [−45,+45]. The up-and-down nodding rotations are dealt with by tolerances of the face detectors. The training set of faces cover such variations to some degree and so the trained system automatically has the ability to detect faces subject to nodding rotations)

Figure 6:
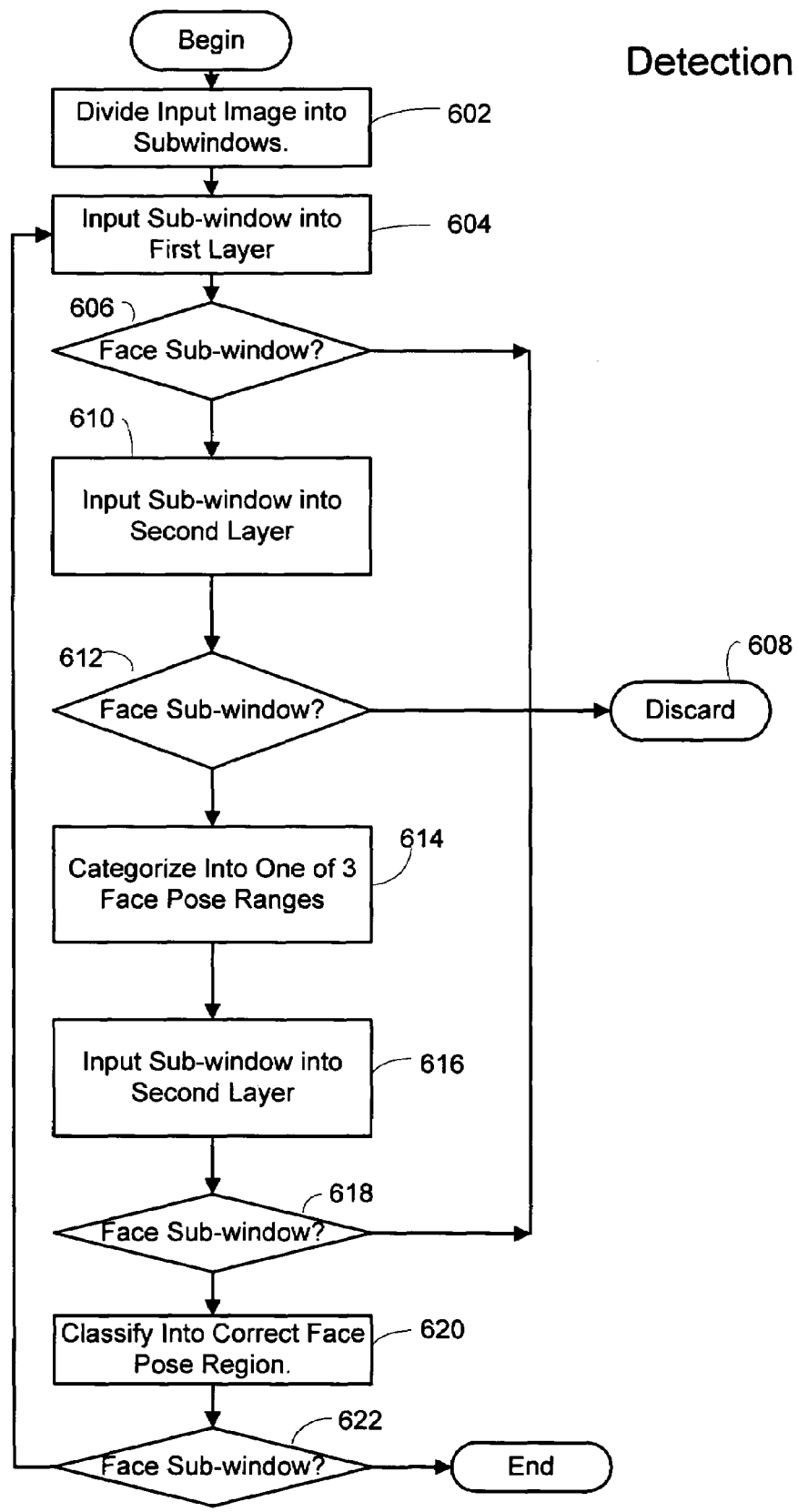
FIG. 6 is a flow diagram depicting the performance of general face detection process of the system and method according to the invention.

Referring now to FIG. 6, the system and method according to the present invention works as follows. The input image is divided into sub-windows (process action 602). For example, a moving window approach can be taken where a window of a prescribed size is moved across the input image, and at prescribed intervals, all the pixels within the sub-window become the next image region to be tested for a face. However, it is not known what size face depicted in an input image may be, and so the size of the sub-window must be considered. One way of ensuring that a face of any practical size depicted in an input image is captured in the sub-window is to adopted an image pyramid approach. In this approach the window size is selected so as to be the smallest practical. In other words, the window size is selected so as to be the size of the smallest detectable face anticipated to be found in the input image. This sub-window size should also match the size chosen for the training face images used to train the system. For a tested embodiment of the present invention a window size of 20 by 20 pixels was chosen. Of course, many or all of the faces depicted in the input image will likely be larger than the aforementioned window size. Thus, the window would only cover a portion of the bigger faces and detection would be unlikely. This is solved by not searching the original input image with the search window (in order to find the "smallest" faces), but by also searching a series of increased scale sub-windows. For example, the original sub-window size can be increased by some scale factor (in a tested embodiment this scale factor was 1.25) in a step-wise fashion all the way up to the input image size itself, if desired. After each increase in scale, the input image is partitioned with the search sub-window size. In this way, larger faces in the original image would eventually fit into the sub-window. Alternately, the original sub-window size could be made to match the entire image and this sub-window can then be scaled down by some scale factor on an incremental basis.

The first sub-window is input into the first detector layer (process action 604). The first detector layer classifies the sub-window as being a face or a non-face, as shown in process action 606. If a sub-window is rejected by the detector at the top layer, it will be seen as a non-face region and will not be processed by later layers, as shown in process action 608. If the sub-window goes through the first detector layer, it will be processed by second layer (process action 610) which evaluates the sub-window (process action 612). If any detector in the second layer classifies the sub-window as a face (process action 614), it will be processed by the last detector layer (process action 616). Otherwise it will be rejected as a non-face (process action 608). The detectors of the last layer again check the face/non-face status of the sub-window (process action 618). If the sub-window is a face, the detectors of the last layers classify it into the correct face pose region (process action 620). Otherwise the sub-window is rejected as non-face (process action 608). This process is repeated for each sub-window as shown in process action 622. There are many more detectors on the last layer of the detector framework, thus helping to detect those possible face regions, while expending much less processing time sub-windows that could not possibly include a face region. In the 13 detector embodiment of the invention, for example, at the final detector layer, each detector only deals with 20 degree ranges of view and each detector has a high detection rate for that view range. This pyramid-like detector framework makes the system and method of the present invention have both a high detection rate and a rapid detection speed for multi-view face detection. In one embodiment of the present invention the extracted sub-window is sent to all detectors in the next level. In an alternate embodiment a frontal view priority policy is adopted. That is, in the lower level, the sub-window is input to the frontal view detector first. If a face is detected by the frontal view face detector, the sub-window is passed to the next level; otherwise it is passed to the view closest to the frontal view face detector; and so on.

2.5 Arbitration Among Detectors Individual Outputs

Figure 7:
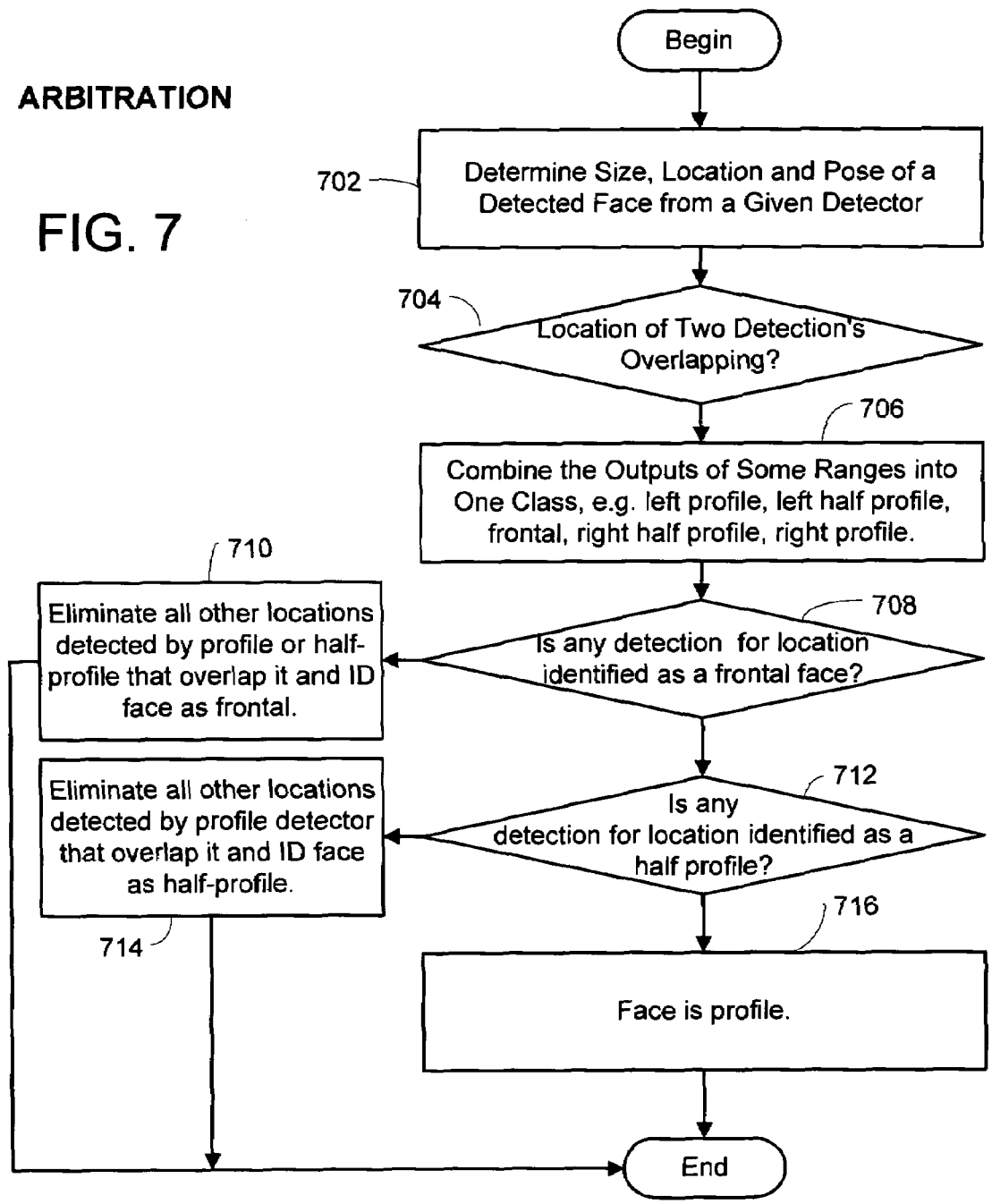
FIG. 7 is a flow diagram depicting the arbitration process used by the system and method according to the invention to arbitrate between face detections that overlap.

It should be noted that there are cases wherein multiple (two or more) detectors detect a face. The system and method according to the present invention must therefore arbitrate between these detections to determine if the detections represent two different faces or two detections of one face. Referring now to FIG. 7, the system therefore determines the location, pose and scale of overlapping face detections (process action 702). If there are no detections that overlap then arbitration is not necessary and each face detection will be determined to be a separate face. If there are multiple detections that overlap and the scale is the same or similar (process action 704), then the system will arbitrate the outputs of the detectors. In this arbitration process the output of some of the detector view ranges will be combined into one class (process action 706). That is, five classes of view ranges are created (left profile, left half profile, frontal, right half profile and right profile) from the various pose range detectors at the detector pyramid's outputs. Then the system arbitrates between these five classes to categorize each overlapping detection into one of these five classes. This can be done using Rowley's heuristic method [23]. However, the present invention can employ another process for arbitration, as shown FIG. 7. In this process the system determines whether a face detection at any particular location is identified as a frontal face (process action 708). If it is then all other locations detected by profile or half profile detectors that are overlapping in the initial image are determined to be errors and are eliminated and that particular location is determined to be a single frontal face (process action 710). If the particular location is not identified as a frontal face, the system determines whether the given location is identified as a half profile face, as shown in process action 712. If the location is identified as a half profile face then all other locations detected by profile face detectors are eliminated and the particular location is determined to be a half profile face (process action 714). If the location is not a nonface, nor a frontal face, nor a half profile face, then the location is determined to be a profile face (process action 716).

3.0 Experimental Results

This section describes the final face detection system including training data preparation, training procedure, and the performance comparison with previous view-based multi-view face detection system for two embodiments of the present system and method according to the present invention. The first embodiment employs 13 detectors, while the second embodiment employs 11 detectors.

3.1 Experimental Results for Embodiment of the Invention Employing 13 Detectors The following paragraphs describe the experimental results for the embodiment of the invention employing 13 detectors. FIG. 8 provides examples of detection results obtained using the system and method according to the present invention with 13 detectors.

3.1.1 Training Data Set

More than 6,000 face samples are collected by cropping from various sources (mostly from video). The view is in the range of [−90°,90°] with −90° representing the left-side view and 0° representing the frontal view. A total number of about 25,000 multi-view face images are generated from the 6,000 samples by artificially shifting or rotation. The multi-view face space is partitioned into smaller and smaller (top-down in the pyramid) subspaces of narrower view ranges. At the top layer, there is only one detector. So in this layer all face samples are grouped into one class. At the second detector layer, there are three detectors, and face samples are grouped into three view classes (frontal, left-profile and right-profile). Face samples labeled with −20°,−10°,0°,10°,20° are grouped as frontal faces, those with [−90°,−30°] are grouped as left-profile face and the faces with [30,90°] are grouped as right-profile faces. At the third detector layer, there are nine detectors, and face samples are grouped into nine view classes of [−90,−80], [−70,−60], . . . , [80,90] degrees.

3.1.2 Training Phase

There are 13 detectors in this embodiment of the system and method according to the present invention, but only eight detectors need be trained. The right view detectors at the second and third layers can be constructed by mirroring features used in left view detectors. This method saves about half train time for our system. These detectors are trained separately, using their own training data. Non-face images used for training these detectors are collected from 12,000 images that do not contain a face.

Every detector can be a cascade and this guarantees high detection speed. At the top layer, the detector is trained using all the faces from −90° to 90°. It has a three-layer structure. The number of features in these three layers is 5, 13 and 20 respectively. It can reject about 50% non-face train data, while retaining 99% face train data in training stage.

At second layer, there are three detectors, each of which is trained to detect part range of the full-view faces. Training faces are separated into three classes to train these detectors. At this layer, each detector has a six-layer structure. This layer totally rejects about 97% of the non-face training data which go through the top layer, and retain 98% of the face training data in training stage. At the bottom layer, face training data is separated into nine classes. At this layer, each detector has an about twenty-layer structure. Each detector has a detection rate of about 94%, and achieves a false positive rate of about $4 \times 10^{-6}$.

3.1.3 Detection Results

The following paragraphs provide the detection results for the 13 detector embodiment of the system and method according to the present invention. The first paragraphs provide the results for the 13 detector embodiment. The following paragraphs provide the test results for an embodiment wherein the last detector layer has detectors with an increased number of pose ranges.

3.1.4 Detection Results For 13 Detector System with 9 Detectors at the Final Layer The final detector is scanned across the image at multiple scales and locations. Scaling is achieved by scaling the detectors themselves, rather than scaling the image in a manner similar taught by Viola [33]. This process makes sense because the features can be evaluated at any scale with the same cost. The detectors are scaled using a factor of 1.25. Given an image is 320 by 240 pixels in size, there are a total of 70,401 sub-windows to be verified in this image. The full-view detector at the top layer needs 110 ms to process all these sub-windows. About 40% of the sub-windows from the test image are rejected by this coarse classifier, and only 41,114 sub-windows can pass through this classifier. At the second layer, there are three detectors. They totally need 77 ms to process all the rest sub-windows. About 97% subwindows of the 41,114 sub-windows are rejected by this layer, and only 1298 sub-windows pass through this layer. At the third layer, there are nine detectors. They process all these 1298 sub-windows. But they only need 15 ms to do it, because most sub-windows are rejected at first and second layers. The timing is summarized in Table 1.

TABLE 1

Times Needed for Each Layer to Run the 320*240 Image.

| Layer | First | Second | Third | Total |
|---|---|---|---|---|
| Time | 110 ms | 77 ms | 15 ms | 202 ms |

3.1.5 Results for Embodiment Wherein Face Space is Partitioned into Smaller Subspaces of Narrower View Ranges at the Third Layer Because spend 15 ms processing time is needed for the third layer, the efficiency of the whole system is not affected much if the multi-view face space is partitioned into smaller subspaces of narrower view ranges at the third layer. That it to say (now we have nine detectors on the third layer), if we decompose multi-view face space into smaller subspaces (for example: 19 view ranges), this system will still has high detection speed, but the detection rate will probably be increased.

TABLE 2

Comparison Between the View-based and Detector-Pyramid Architectures in Speed for Multi-View Face Detection.

| Method | View-based | Detector-Pyramid |
|---|---|---|
| Time | 976 ms | 202 ms |

If the pyramid-like framework of the system and method according to the present invention were not used, all these nine detectors at the third layer could be applied directly on all sub-windows without coarse classification at the top and second layers. This method (termed view-based) costs much time for multi-view face detection as can be seen in Table 2.

An embodiment of the system was tested on a CMU profile face test set (courtesy of Schneiderman and Kanade). This test set consisted of 208 images with 441 faces of which 347 were profile views from various news web sites. These images were not restricted in terms of subject matter or background scenery. The performance in accuracy and speed of the system and method of the present invention is summarized in Table 3, in comparison with those of the Schneiderman-Kanade system. The invention has the accuracy almost as good as that of the Schneiderman-Kanade system, but runs about 270 times faster.

TABLE 3

Comparison of Multi-View System with Schneiderman-Kanade's System.

| | Detection Rate | False Alarms | Time |
|---|---|---|---|
| Schneiderman | 75.2% | 12 | 60,000 ms |
| Our method | 72.6% | 14 | 202 ms |

3.2 Experimental Results for Embodiment of the Invention Employing 11 Detectors The following paragraphs describe the experimental results for the embodiment of the invention employing 11 detectors.

3.2.1 Training Data Set

About 6,000 multi-view face examples are collected from various sources, covering the full range [−90°,−90°] of out-of-plane rotations. They were roughly aligned by eyes and mouth. Each aligned face is then in-plane rotated to cover the range of [−15°,+15°]. The images are then cropped and re-scaled to the size of 20×20. Sufficient nonface examples are also collected. The output from the bottom level of the detector-pyramid has a detection rate of about 94% and a false positive rate of about $10^{-6}$.

3.2.2 Detection Results

The following paragraphs provide the detection results for the 11 detector embodiment of the invention. The first paragraphs provide the results for the 11 detector embodiment. The following paragraphs provide the test results for an embodiment wherein the last detector layer has detectors with an increased number of pose ranges.

Figure 9:
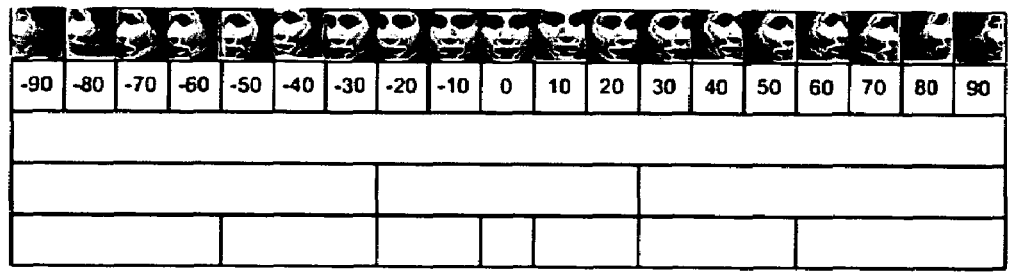
FIG. 9. provides a diagram of out-of-plane head rotations (row 1), the facial view labels (row 2), and the coarse-to-fine view partitions at the three levels of the detector-pyramid (rows 3-5).

As shown in FIG. 9, the full range θ of out-of-plane rotations is partitioned into increasingly narrower ranges, and thereby the whole face space is divided into increasingly smaller subspaces. This implementation of the detector-pyramid consists of 3 levels. The partitions of the out-of-plane rotation for the 3 levels is illustrated in FIG. 9. The top level covers the full range (1 channel), the 2nd partitions it into 3 sub-ranges (3 channels), and the 3rd level at the bottom does 7 sub-ranges. So there are altogether 1+3+7=11 detectors in the detector-pyramid.

First, the multi-view face detection system and process using FloatBoost is compared with other methods on the MIT+CMU test set consisting of 125 images containing 481 faces. (The reader is referred to [5] for a more comprehensive comparison with other systems). The contrasted methods are AdaBoost (with training examples of size 20×20 as implemented in the system and method according to the present invention), AdaBoost (24×24 as reported in [33]), and Rowley et al.'s (CMU-NN) [23]. The results are shown in Table 4, where "N.Fea" stands for number of features and "N.FA" for number of false alarms. The comparison Our algorithm using FloatBoost selects a total of 2546 features or weak classifiers for the 20×20 training sets to achieve the performance. This is about ⅔ of 3872 needed by the AdaBoost counterpart for the 20×20 training sets.

TABLE 4

Comparison with AdaBoost and Neural Network Methods in Frontal Face Detection.

| | Floatboost | Adaboost(20) | Adaboost (24) | CMU-NN |
|---|---|---|---|---|
| N.FA = 10 | 83.6% | 82.7% | 76.1% | 83.2% |
| N.FA = 31 | 90.2% | 89.2% | 88.4% | 86% |
| Times | 50 ms | 60 ms | 67 ms | |

Next, the multi-view face detection system and method of the invention is compared with the Schneiderman-Kanade (CMU) system [26] on the CMU profile face test set. This test set consists of 208 images with 441 faces of which 347 were profile views from various news web sites. These images were not restricted in terms of subject matter or background scenery. The performance in accuracy and speed is summarized in Table 5. The multi-view face detection system has the accuracy nearly as good as that of the Schneiderman-Kanade system but runs about 270 times faster.

TABLE 5

Comparison with Schneiderman-Kanade System in Multi-view Face Detection

|  | Floatboost | CMU-NN |
|---|---|---|
| N.FA | 14 | 12 |
| Det. Rate | 72.6% | 75.2% |
| Times | 202 ms | 60,000 ms |

Figure 10:
FIG. 10. provides a schematic illustration of a merge from different channels. From left to right: Outputs of fontal, left, right view channels, and the final result after merge.

Although there are no overlaps between the partitioned view sub-ranges at each level, a face detector trained for one view may detect faces of its neighboring views. Therefore, faces detected by the 7 channels at the bottom level of the detector-pyramid need to be merged to give the final result. The merge of the different channels is schematically illustrated in FIG. 10 (from left to right: outputs of fontal, left, right view channels, and the final result after merge).

3.3 Complexity

The image is scanned by the detector-pyramid at multiple scales and locations. Scaling is achieved by scaling the detectors themselves, rather than scaling the image as in [33]. With the scaling factor of 1.25, there are a total of 70,401 sub-windows to be classified for an image of 320× 240 pixels.

TABLE 6

Processing Times for a 320 × 240 Image and Error Rates.

| Level | Time | Det. Rate | N. FA |
|---|---|---|---|
| 1 | 110 ms | 99.5% | 60% |
| 2 | 77 ms | 98.5% | 3% |
| 3 | 15 ms | 94% | $10^{-6}$ |
| Total | 202 ms | 94% | $10^{-6}$ |

The timing and rates are summarized in Table 6. After 110 ms filtering of the 1st level, about 40% sub-windows from test image are rejected by this coarse classifier, and only 41,114 sub-windows can pass through this classifier. About 97% sub-windows of the 41,114 sub-windows are rejected as the result of the further filtering by the 2nd level. Only 1298 sub-windows pass through. The 7 detectors at the 3rd level, process all these remaining sub-windows. But they only need a total of 15 ms to do it.

If purely view-based structure were used, it would need 7 view-based detectors, each going from the beginning to the end. This method would need 976 ms for the multi-view face detection, about 4.8 times the time needed by the detector-pyramid structure. Because only a relatively small number of sub-windows left after level 2, partitioning the full view into narrower view sub-ranges at the 3rd level, and even adding a 4th level, will need only a little increase in processing time than the current 15 ms.

REFERENCES

1. Y. Amit, D. Geman, and K. Wilder. "Joint induction of shape features and tree classifiers". IEEE Transactions on Pattern Analysis and Machine Intelligence, 19:1300-1305, 1997.
2. M. Bichsel and A. P. Pentland. "Human face recognition and the face image set's topology". CVGIP: Image Understanding, 59:254-261, 1994.
3. J. Bins and B. Draper. "Feature selection from huge feature sets". In Proceedings of IEEE International Conference on Computer Vision, pages 159-165, Jul. 9-12, 2001.
4. F. Crow. "Summed-area tables for texture mapping". In SIGGGRAPH, volume 18(3), pages 207-212, 1984.
5. B. K. L. Erik Hjelmas. "Face detection: A survey". Computer Vision and Image Understanding, 3(3), September 2001.
6. J. Feraud, O. Bernier, and M. Collobert. "A fast and accurate face detector for indexation of face images". In Proc. Fourth IEEE Int. Conf on Automatic Face and Gesture Recognition, Grenoble, 2000.
7. F. Fleuret and D. Geman. "Coarse-to-fine face detection". International Journal of Computer Vision, 20:1157-1163, 2001.
8. Y. Freund and R. Schapire. "A decision-theoretic generalization of on-line learning and an application to boosting". Journal of Computer and System Sciences, 55(1): 119-139, August 1997.
9. J. Friedman, T. Hastie, and R. Tibshirani. "Additive logistic regression: a statistical view of boosting". Technical report, Department of Statistics, Sequoia Hall, Stanford University, July 1998.
10. S. Gong, S. McKenna, and J. Collins. "An investigation into face pose distribution". In Proc. IEEE International Conference on Face and Gesture Recognition, Vermont, 1996.
11. J. Huang, X. Shao, and H. Wechsler. "Face pose discrimination using support vector machines (SVM)". In Proceedings of International Conference Pattern Recognition, Brisbane, Queensland, Australia, 1998.
12. A. Jain and D. Zongker. "Feature selection: evaluation, application, and small sample performance. IEEE Trans. on PAMI, 19(2):153-158, 1997.
13. G. H. John, R. Kohavi, and K. Peger. "Irrelevant features and the subset selection problem". In Processings of the Eleventh International Conference on Machine Learning, pages 121-129, 1994.
14. J. Kittler. "Feature set search algorithm". In C. H. Chen, editor, Pattern Recognition in Practice, pages 41-60. North Holland, Sijthoff and Noordhoof, 1980.
15. A. Kuchinsky, C. Pering, M. L. Creech, D. Freeze, B. Serra, and J. Gwizdka. "FotoFile: A consumer multimedia organization and retrieval system". In Proc. ACM HCI'99 Conference, 1999.
16. Y. M. Li, S. G. Gong, and H. Liddell. "Support vector regression and classification based multi-view face detection and recognition". In IEEE Int. Conf. Of Face & Gesture Recognition, pages 300-305, France, March 2000.
17. J. Ng and S. Gong. "Performing multi-view face detection and pose estimation using a composite support vector machine across the view sphere". In Proc. IEEE International Workshop on Recognition, Analysis, and Tracking of Faces and Gestures in Real-Time Systems, pages 14-21, Corfu, Greece, September 1999.
18. E. Osuna, R. Freund, and F. Girosi. "Training support vector machines: An application to face detection". In CVPR, pages 130-136, 1997.
19. C. P. Papageorgiou, M. Oren, and T. Poggio. "A general framework for object detection". In Proceedings of IEEE International Conference on Computer Vision, pages 555-562, Bombay, India, 1998.
20. A. P. Pentland, B. Moghaddam, and T. Starner. "View-based and modular eigenspaces for face recognition". In Proceedings of IEEE Computer Society Conference on Computer Vision and Pattern Recognition, pages 84-91, 1994.
21. P. Pudil, J. Novovicova, and J. Kittler. Floating search methods in feature selection. Pattern Recognition Letters, 15(11):1119-1125, 1994.
22. D. Roth, M. Yang, and N. Ahuja. "A snow-based face detector". In Proceedings of Neural Information Processing Systems, 2000.
23. H. A. Rowley, S. Baluja, and T. Kanade. "Neural network-based face detection". IEEE Transactions on Pattern Analysis and Machine Intelligence, 20(1):23-28, 1998.
24. R. Schapire, Y. Freund, P. Bartlett, and W. Lee. Boosting the margin: a new explanation for the effectiveness of voting methods. In Proc. 14th International Conference on Machine Learning, pages 322-330. Morgan Kaufmann, 1997.
25. R. E. Schapire and Y. Singer. "Improved boosting algorithms using confidence-rated predictions". In Proceedings of the Eleventh Annual Conference on Computational Learning Theory, pages 80-91, 1998.
26. H. Schneiderman and T. Kanade. "A statistical method for 3d object detection applied to faces and cars". In Proceedings of IEEE Computer Society Conference on Computer Vision and Pattern Recognition, 2000.
27. P. Y. Simard, L. Bottou, P. Haffner, and Y. L. Cun. "Boxlets: a fast convolution algorithm for signal processing and neural networks". In M. Kearns, S. Solla, and D. Cohn, editors, Advances in Neural Information Processing Systems, volume 11, pages 571-577. MIT Press, 1998.
28. P. Y. Simard, Y. A. L. Cun, J. S. Denker, and B. Victorri. "Transformation invariance in pattern recognition—tangent distance and tangent propagation". In G. B. Orr and K. -R. Muller, editors, Neural Networks: Tricks of the Trade. Springer, 1998.
29. P. Somol, P. Pudil, J. Novoviova, and P. Paclik. "Adaptive floating search methods in feature selection". Pattern Recognition Letters, 20:1157-1163, 1999.
30. S. D. Stearns. "On selecting features for pattern classifiers". In Proceedings of International Conference Pattern Recognition, pages 71-75, 1976.
31. K. -K. Sung and T. Poggio. "Example-based learning for view-based human face detection". IEEE Transactions on Pattern Analysis and Machine Intelligence, 20(1):39-51, 1998.
32. K. Tieu and P. Viola. "Boosting image retrival". In Proceedings of IEEE Computer Society Conference on Computer Vision and Pattern Recognition, volume 1, pages 228-235, 2000.
33. P. Viola and M. Jones. "Robust real time object detection". In IEEE ICCV Workshop on Statistical and Computational Theories of Vision, Vancouver, Canada, Jul. 13, 2001.
34. L. Wiskott, J. Fellous, N. Kruger, and C. V. Malsburg. "Face recognition by elastic bunch graph matching". IEEE Transactions on Pattern Analysis and Machine Intelligence, 19(7):775-779, 1997.

The invention claimed is:

1. A computer-implemented face detection process for detecting a person's face in an input image and identifying a face pose range into which the face pose exhibited by the detected face falls, comprising using a computer to perform the following process actions:
creating a database comprising a plurality of training feature characterizations, each of which characterizes the face of a person at a known face pose or a non-face;
training a plurality of detectors arranged in a pyramidal architecture to determine whether a portion of an input image depicts a person's face having a face pose falling within a face pose range associated with one of the detectors using the training feature characterizations; and wherein
said detectors using a greater number of feature characterizations are arranged at the bottom of the pyramid, and wherein
said detectors arranged to detect finer ranges of face pose are arranged at the bottom of the pyramid;
inputting a portion of an input image into the plurality of detectors arranged in a pyramid architecture; and
interpreting the output of the plurality of detectors to determine whether the portion of the input image contains a face and if so to identify the pose associated with each detected face.

2. The process of claim 1 wherein each of said detectors of said plurality of detectors comprises at least one classifier, said at least one classifier employing a unique feature that characterizes a face with poses within the range of the detector, each classifier of the detector determined by employing a statistical process to identify the classifier or classifiers that best indicates that the portion of the input image under consideration is a face in the pose range associated with the detector.

3. The process of claim 1 wherein the process action of creating a database comprises the actions of:
capturing training images of faces of a plurality of people at a variety of face poses; and
preprocessing said images to prepare them for input into the plurality of detectors arranged in a pyramid architecture.

4. The process of claim 3 wherein the process action of preprocessing the images to prepare them for input into the detector-pyramid comprises the actions of:
normalizing each training image by resizing it to a prescribed scale if not already at the prescribed scale and adjusting the region so that the eye locations of the depicted subject fall within a prescribed area;
cropping each training image to eliminate unneeded portions not specifically depicting part of the face of the subject;
categorizing the normalized and cropped training images according to their face pose by grouping the images into a set of pose ranges.

5. The process of claim 1 wherein each detector is constructed based on one or more weak classifiers.

6. The process of claim 5 wherein each classifier performs face/non-face classification using a different single feature.

7. The process of claim 1 wherein each detector can be one of:
a single face/non-face classifier; and
a cascade of face/non-face classifiers.

8. The process of claim 1 wherein said detectors at the bottom of the pyramid using a greater number of feature characterizations and arranged to detect finer ranges of face pose are more complex.

9. The process of claim 1 wherein training the detectors comprises one of:
using a Gaussian model;
using a small set of simple image features and a neural network;
using a boosting algorithm; and
using a support vector machine.

10. The process of claim 1 wherein training the detectors comprises the following process actions:

designing a set of simple features;
selecting a subset of the set of simple features;
training a set of weak classifiers using said subset of features;
constructing a strong classifier from a linear combination of weak classifiers;
at each level of the pyramid, partitioning the full range of face poses into a number of sub-ranges and training the same number of detectors for face detection in each partition, each detector specialized for a certain pose sub-range; and
composing the detector-pyramid of several levels from the coarsest view partition at the top to the finest view partition at the bottom.

11. The process of claim 1 wherein each detector is designed to detect one face pose range associated with that detector.

12. The process of claim 11 wherein the face pose range of a detector may partially overlap the face pose range associated with another detector.

13. The process of claim 1 wherein detectors only on one side of the detector pyramid are trained, and detectors on the other side of the pyramid are deemed to be the mirrors of the trained side.

14. The process of claim 13 wherein the training time of training the detectors of the detector pyramid is cut in half because only the detectors on one side of the detector pyramid are trained.

15. The process action of claim 1, wherein the process action of inputting a region from the input image comprises the action of:
partitioning said input image into sub-windows.

16. The process action of claim 15 wherein said partitioning of said input image into sub-windows comprises moving a search window of a prescribed size across the input image and prior to each shift extracting the pixels contained within the search window to create an input image region.

17. The process of claim 16, further comprising the process actions of:
employing a search window having a size approximately equal to the size of the smallest face it is anticipated will be depicted in the input image and which it is desired to detect;
after regions from every part of the input image it is desired to screen for faces have been extracted, reducing the size of the input image by a prescribed scale increment;
progressively shifting the search window across the reduced input image and prior to each shift extracting the pixels contained within the search window to create an input image region; and
repeating the reducing and shifting process actions until a prescribed reduction limit is reached.

18. The process of claim 16, wherein the search window size corresponds to the size of the training images.

19. The process of claim 16, wherein the search window size is the size of the smallest detectable face anticipated to be found in the input image.

20. The process of claim 19, wherein the search window size is 20 by 20 pixels.

21. The process of claim 1 wherein the process action of inputting a portion of an input image into the plurality of detectors arranged in a pyramid architecture comprises:
inputting a portion of the input image into a first detector layer;
if the portion of the input image is rejected by the detector at the top layer, it is classified as a non-face region it is not processed by detectors in later detector layers;
if the portion of the input image is processed by the detectors in the first detector layer, it is processed by the second layer, if a detector in the second layer classifies the input image portion as a non-face region it is not processed by detectors in the third layer;
if the portion of the input image is processed by the detectors in the second detector layer, it is processed by the third detector layer, which classifies the input image region into a face pose range corresponding to a detector trained to detect a given face pose range.

22. The process of claim 1 wherein inputting a portion of an input image into the plurality of detectors arranged in a pyramid architecture further comprises
arbitrating between two or more detectors that detect a face in the same detector layer to determine if the detections represent two different faces or two detections of one face.

23. A system for detecting an object in an input image, the system comprising:
a general purpose computing device; and
a computer program comprising program modules executable by the computing device, wherein the computing device is directed by the program modules of the computer program to
create a database comprising a plurality of training feature characterizations, each of which characterizes an object being sought at a known orientation or a an object not being sought;
train a plurality of detectors arranged in a pyramidal architecture to determine whether a portion of an input image depicts an object being sought having an orientation within an orientation associated with one of the detectors using the training feature characterizations; and wherein
said detectors using a greater number of feature characterizations are arranged at the bottom of the pyramid, and wherein
said detectors arranged to detect finer ranges of object orientation are arranged at the bottom of the pyramid;
input a portion of an input image into the plurality of detectors arranged in a pyramid architecture; and
interpret the output of the plurality of detectors to determine whether the portion of the input image contains an object being sought and if so to identify the orientation associated with each detected object being sought.

24. A computer-readable medium having computer-executable instructions for detecting a person's face in an input image, said computer executable instructions comprising:
creating a database comprising a plurality of training feature characterizations, each of which characterizes the face of a person at a known face pose or a non-face;
training a plurality of detectors arranged in a pyramidal architecture to determine whether a portion of an input image depicts a person's face having a face pose falling within a face pose range associated with one of the detectors using the training feature characterizations, said plurality of detectors when trained being capable of determining whether a portion of an input image depicts a person's face; and wherein
said detectors using a greater number of feature characterizations are arranged at the bottom of the pyramid, and wherein
said detectors arranged to detect finer ranges of face pose are arranged at the bottom of the pyramid.

25. A face detection system for detecting a person's face depicted in an input image and identifying a face pose range, among a set of pose ranges, into which the pose associated with the detected face falls, comprising:
- a database comprising a plurality of training feature characterizations, each of which characterizes the face of a person at a known face pose or a non-face;
- a plurality of detectors arranged in a pyramidal architecture to determine whether a portion of an input image depicts a person's face having a face pose falling within a face pose range associated with one of the detectors using said training feature characterizations; and wherein
- said detectors using a greater number of feature characterizations are arranged at the bottom of the pyramid, and wherein
- said detectors arranged to detect finer ranges of face pose are arranged at the bottom of the pyramid.

* * * * *